United States Patent Office 3,330,063
Patented July 11, 1967

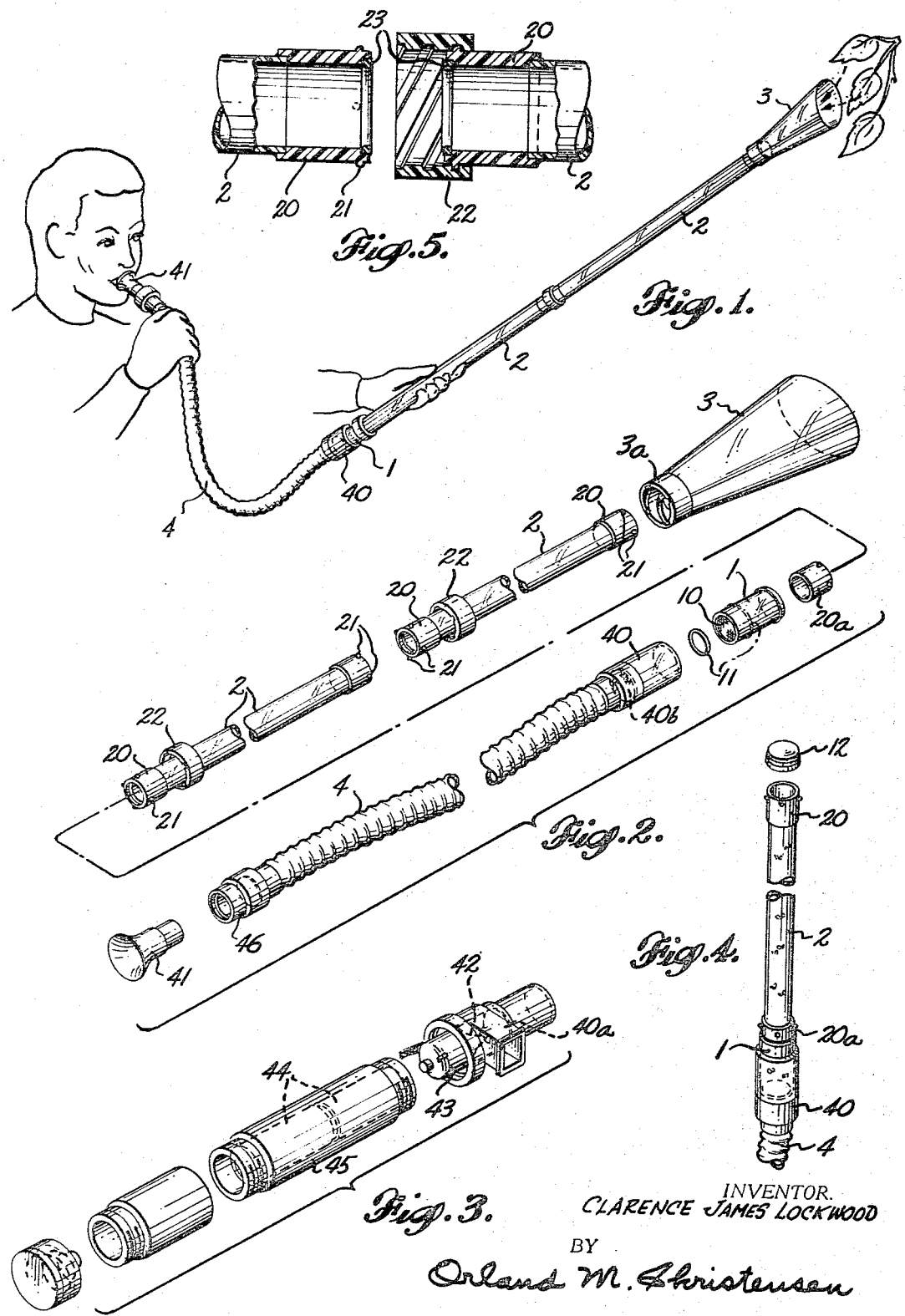

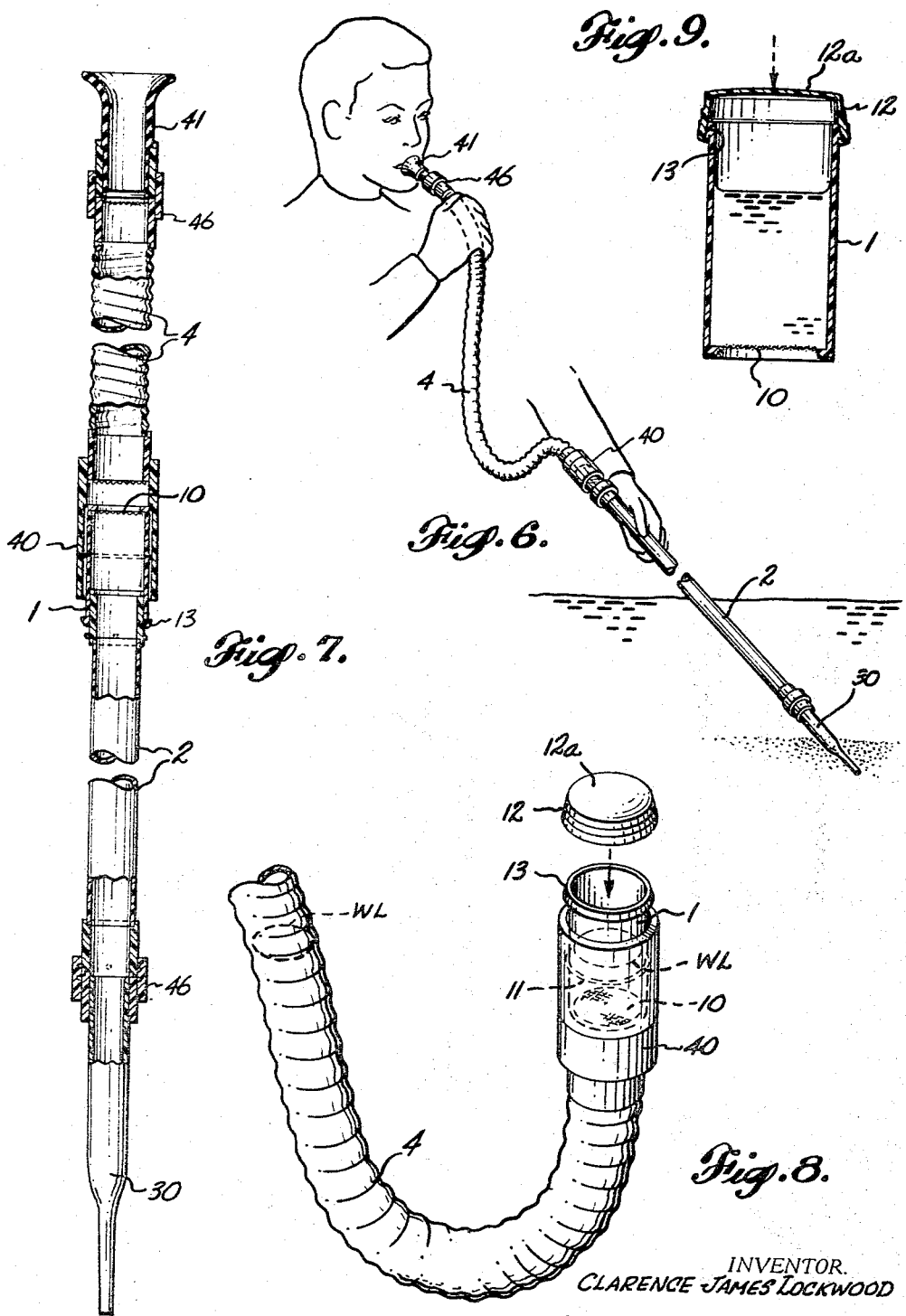

3,330,063
SPECIMEN COLLECTING APPARATUS
Clarence James Lockwood, Seattle, Wash.
(5265 Forest SE., Mercer Island, Wash. 98040)
Filed Oct. 19, 1965, Ser. No. 497,919
10 Claims. (Cl. 43—134)

The collection of live biological and geological specimens for extended study is a matter of interest to many people, whether they be amateurs, students, teachers, or writers. Some such persons are interested in insects found upon the ground, on foliage, or flying about in air; at other times these or other persons are interested in water-borne specimens, or in geological specimens from the bottom of a body of water. It is difficult to catch very small specimens, or those that move about rapidly, or that cling tightly to a support, or that can be found only at material distances above the ground, as in the foliage of a tree, for instance. Once having caught any specimen, by procedures presently employed, it is difficult to transfer the specimen to an observation chamber, where it can be kept and studied in the different stages of its development, without injury to the specimen and without risking its escape during the transfer. It is difficult to collect water-borne specimens that are to be found only at certain depths, without at the same time gathering others from the upper depths.

The present invention has for its principal purpose the provision of a kit for gathering live biological specimens of all kinds and sizes, or geological specimens that are for some reason inaccessible, and which kit is or can be adapted to the collection of air-borne specimens (by that term including all other than water-borne specimens) of a wide difference is size, agility, and manner of locomotion, and at levels from ground level to a level at or approaching the tops of trees, and which is or can be adapted also to the collection of water-borne specimens from any depth within reason, all in a manner to avoid escape of or harm to the specimens, and likewise, to avoid harm to the collector, as for instance, by reason of contact with the specimen.

It is also an object to provide such a kit from which a specimen can be safely transferred to an observation chamber, with little likelihood of escape of the specimen.

It is an object, particularly desirable when water-borne specimens, whether biological or geological, are to be examined, to concentrate a number of specimens within a small space, and even to regulate the quantity of water in the collection chamber before or after removal of the specimen-collecting chamber.

A further object is to provide a kit of the character indicated which is flexibly adapted for use in any of the various ways suggested, and which is formed of separate parts that are easily and quickly capable of assembly in the field, to suit the prevalent conditions or the types of specimens to be collected.

The provision of such a kit that is inexpensive, light in weight, transparent at least in part so that collected specimens can be preliminarily observed, and not bulky nor awkward to carry or to assemble or disassemble, are among further objects of the invention.

Included in the invention, in addition to the kit as a whole that is shown herein in an illustrative form, are several of the elements making up the kit, and certain joints whereby the elements may be joined readily in a manner suited to existing conditions.

FIGURE 1 is a perspective view of the kit assembled in a manner adapted to collect relatively small air-borne specimens from a level overhead.

FIGURE 2 is an isometric view of the same assembly, but with the individual parts disconnected.

FIGURE 3 is an exploded isometric view of an alternative suction-inducing means usable with the kit of FIGURES 1 and 2, in lieu of the specific suction-inducing means shown in those figures.

FIGURE 4 is an isometric view of a portion of the same kit as is shown in FIGURES 1 and 2, illustrating one way of enlarging the specimen-collecting chamber.

FIGURE 5 is an axial sectional view of certain complemental but disconnected elements of the kit, and of the coupling that is operable to join these elements.

FIGURE 6 is a view similar to FIGURE 1, but shows the kit assembled and in use for collecting water-borne specimens.

FIGURE 7 is an axial sectional view of the latter form of the kit.

FIGURE 8 is an isometric view of portions of the same kit, illustrating one manner of regulating the water level of, and generally the concentration of specimens in, a water sample in the specimen-collecting chamber.

FIGURE 9 ls an axial sectional view through a screen-ended specimen-collecting chamber that is partially filled with water, and illustrates another way of lessening the amount of water in such chamber.

The kit in the form shown in FIGURES 1 and 2 includes a funnel-shaped collection tip 3, secured upon an end of rigid tubular extension means that may include one, two, or several sections 2, coupled together airtightly end-to-end to reach to the desired height or distance, a specimen-collecting chamber 1 end-abutting and coupled to the other end of the tubular extension means 2, and screened at 10 at its opposite ends, and a suction-inducing means joined to the chamber 1 or sealed with respect to a sleeve 40 of a flexible suction tube 4, within which sleeve the chamber 1 is received. The collection tip 3 would usually be removably mounted upon the end of the tubular extension means. A mouthpiece 41 may be removably carried by the tube 4, by means of which the user may draw in air through the assembled kit, and so may suck a specimen into the chamber 1 from the tip 3. The specimen is stopped within chamber 1 by the screen 10. This will enable collection of moths, gnats, flies, etc. If the specimen (a wasp, for example) is larger or stronger, or clings more tightly to a support, a battery-operated fan 42, shown in FIGURE 3, driven by a motor 43 powered by dry cells 44 within a housing 45, may be attached to the sleeve 40 instead of the tube 4, to induce a stronger suction. The more dry cells used the greater the voltage, and the stronger is the suction.

If on the other hand, water-borne specimens are to be collected, and in particular, sediment from the bottom of a body of water, the assembly of the kit is similar, except that it is preferred to use a narrowed down nozzle 30 (FIGURES 6 and 7) instead of the flared collection tip 3. By joining several tubular extensions 2 the tip 30 can be plunged into the water to any desired depth, and the sample taken will be contaminated little or not at all by immersion of the tip of the desired depth.

For coupling together two or more sections 2, each end of each section is provided with an integral end piece 20, formed with outstanding lugs 21, and a coupler sleeve 22 fits upon one such end piece (at the right in FIGURE 5), and engages the other end piece to urge the two tightly together, end to end. To do this the coupler sleeve 22 is internally threaded at 22a to fit the lugs 21 on both end pieces 20, but the threads are closed at one end—at the right, in FIGURE 5. The effect of this is to draw the end of the left-hand tubular section 2 tightly against the end of the right-hand section 2 after the sleeve 22 stops turning relative to the right-hand section. To insure tightness of the joint a sealing ring or rings 23 may be located in recesses in the abutting ends of the sections 2, as in FIGURE 5. As many sections may be joined in this manner as are available, and can be manipulated by the user when joined. If each section is fifteen inches long, four joined sections can reach to a distance of five feet, laterally or overhead.

Similar joints can be employed to join other elements of the kit, or in some instances a friction-tight joint better serves the purpose. The collection tip 3 or 30 is normally joined to the end of the tubular sections 2 by an integral threaded coupler 3a that fits the lugs 21 of the outermost tube 2. The mouthpiece 41, on the other hand, is preferably a friction-tight fit within a sleeve 46 integral with the end of the flexible suction tube 4.

The sleeve 40 that may be integral with the opposite end of suction tube 4, or the equivalent sleeve 40a that serves as the intake to fan 42, is large enough that the screened specimen-collecting chamber 1 slips readily into or from it. To seal during use against leakage in the space between them what is in effect an O-ring 11 is used. A small rubber band serves the purpose quite well. An end piece 20a, similar to the end pieces 20, fits frictionally within the end of chamber 1, and serves as a means of coupling the chamber 1 to the inner end of the tubular series 2, yet the piece 20a is readily removable when the specimen is within the chamber 1. The chamber 1 is formed at this end, opposite its screen 10, to receive a tight fitting closure cap 12 (FIGURES 4, 8 and 9). The chamber 1 may be formed with a slightly outstanding flange 13 at this end, and the cap 12, of flexible plastic material or the like, will fit tightly thereon—so tightly, indeed, that water within the chamber will not leak through the fine mesh screen 10. By making the diaphragm portion 12a of the cap 12 flexible, it can serve as a diaphragm pump to force some of the water through the screen, thereby concentrating the specimens in the remaining water, or expelling exceptionally small specimens.

It is desirable that the end of the sleeve 40 be provided with a fine mesh screen 40b adjacent but spaced from the screen 10 of the specimen-collecting chamber 1.

The entire kit is preferably made of plastic material, with the exception of parts such as the mouthpiece 41 that must be quite flexible, and is made of rubber. The specimen-collecting chamber 1 and its receiving sleeve 40 should be of transparent plastic, in order that the user can see when the specimen is received therein, and if the rigid tubular sections 2, the flexible suction tube 4, and at least the collection tip 3, if not the nozzle 30, be of clear or transparent plastic, the use of the device is materially helped. The plastic is of light weight, yet adequately rugged, and inexpensive.

The user can carry the kit, disassembled or partly assembled, into the field in a bag or like container. Should he observe a specimen upon a tree, as in FIGURE 1, that he desires to examine closely, he inserts a collection chamber 1 within the sleeve 4, and a mouthpiece 41 at the opposite end of suction tube 4. He couples together as many lengths of tubular sections 2 as may be required, and couples one end thereof to end piece 20a, and to the other end he couples collection tip 3. Now by extending tip 3 to the vicinity of the specimen, and sucking in at the mouthpiece 41 he draws the specimen into the collection chamber 1, with little likelihood of injuring it. If the specimen is too large or resistant to being sucked in by mouth suction, the powered fan 42 can be coupled instead of flexible tube 4, or to the end of the latter. He can examine the specimen within the transparent chamber 1, and if it is one he wishes to keep he slips the coupling terminal 20a from the end of chamber 1, applies a cap 12 in its place, and withdraws the chamber 1 from its sleeve 40. Now, or later, merely by removing the cap and placing an observation chamber in end-to-end relation to the collecting chamber, he can transfer the specimen to the observation chamber (not shown herein), where it can be kept as long as necessary.

If he is collecting submarine specimens, he couples together a sufficient number of tubular sections 2 to reach the desired depth or distance, and upon their end he couples the nozzle 30. In other respects the assembly is unchanged. The narrowed nozzle 30 will not admit any appreciable quantity of water while it is being plunged into the water, until suction begins at 41 or at 42. He can observe the entry of water into the collection chamber 1, and can control the amount left therein by balancing it against the amount within the flexible tube 4, as shown in FIGURE 8. If after emplacement of the closure cap 12, and removal of the chamber 1 from sleeve 40 there is still too much water within the chamber 1 he can pump water through the screen 10 by operating the cap 12 as a diaphragm pump. The screen 10 is of such fine mesh, and is inset above the lower margin of the chamber 1, that so long as cap 12 is in place and unflexed, no leakage will occur.

If a collection chamber larger than the chamber 1 be desired, instead of uncoupling terminal 20a and tube section 2 from the chamber 1, they can be left in place, and the tube section or sections 2 then become an extension of the collecting chamber 1, and the cap 12 will fit a coupling terminal 20, as in FIGURE 4.

What is claimed is:
1. An aspirator type specimen collection kit comprising:
    (1) a mouthpiece;
    (2) an elongated flexible aspirator tube having:
        (a) means on one end adapted to be removably coupled to said mouthpiece,
        (b) a transparent cylindrical sleeve mounted axially aligned with the aspirator tube on the other end thereof and having an inside diameter larger than that of said aspirator tube, and
        (c) filter means mounted in said aspirator tube between the sleeve and the mouthpiece coupling means;
    (3) at least one transparent, cylindrical specimen collection and storage chamber having
        (a) an open end adapted to receive specimens and
        (b) a screened end, and
        (c) being adapted to fit removably within said sleeve;
    (4) means for effecting a substantially airtight seal between the outside of said chamber and the inside of said sleeve;
    (5) a rigid transparent extension tube adapted at one end to be coupled to said specimen chamber for passage of air directly through said extension tube, chamber, and aspirator tube;
    (6) a collection tip member adapted to be coupled to the other end of said extension tube; and
    (7) a closure cap for said specimen collection chamber.

2. The kit defined in claim 1 further including a flexible O-ring seal, and wherein the spacing between the outside of said chamber and the inside of said sleeve is sufficient to accommodate said seal around said chamber whereby as the chamber is inserted into the sleeve the seal is rolled along the outside of the chamber and along the inside of the sleeve to a position effecting said airtight seal and securing the chamber in the sleeve.

3. The kit defined in claim 1 wherein said extension tube includes coupling means on one end thereof comprising a terminal portion of a size and shape to fit snugly into air-sealing relationship in the open end of said specimen chamber, said closure cap being adapted to fit externally over the open end of said chamber and alternatively over said other end of the extension tube.

4. The kit defined in claim 1 wherein the portion of said closure cap which extends across the opening of the chamber is constructed of flexible, resilient material capable of being manually flexed to alter the pressure within said chamber, and wherein the mesh of said screen is sufficiently coarse to pass air freely and of sufficient fineness to hold water within the chamber by surface tension when the chamber is capped, whereby inward flexure of the cap expells water through the screen and release of the cap permits resilient return thereof to its normal shape to draw a corresponding amount of air into the chamber.

5. An aspirator type specimen collection device for collecting air- and water-borne specimens, comprising a mouthpiece; a flexible aspirator tube; a specimen receiving chamber; and an extension tube; all having substantially the same inside diameter and adapted to be removably coupled end-to-end in axially aligned relationship to form an integral assembly; said aspirator tube having at one end a transparent chamber-receiving sleeve of enlarged diameter; said chamber being also transparent and having a screen integrally mounted within one end and the other end open, the screened end thereof being adapted to fit removably within said aspirator tube sleeve in airtight relationship; and said extension tube having one end adapted to be coupled removably in airtight relationship with said chamber to deliver specimens directly thereto in response to suction applied at the mouthpiece.

6. The specimen collecting device defined in claim 5, including a closure cap for said chamber constructed from resiliently flexible material, said cap being operable by manual flexure to pump liquid from within the collection chamber through its screened end, said screen being of mesh suffiicent to pass air and water under pressure but to hold water within the capped chamber when held with its screened end down without flexure of said cap.

7. The specimen collecting device defined in claim 5 further including a collection tip having one end of inside diameter substantially equal to that of said extension tube and adapted to be removably coupled thereto, and further having at its other end a tip portion of reduced diameter forming a suction nozzle for reception of liquid-borne specimens.

8. The specimen collecting device defined in claim 5 wherein the specimen-receiving chamber has a cross-section exteriorly slightly smaller than the interior cross-section of said sleeve, an O-ring fitting the specimen-receiving chamber exteriorly and adapted to roll into sealing position between the same and the interior of the sleeve when the specimen-receiving chamber is pushed into the sleeve.

9. The specimen collection device defined in claim 5 including a plurality of said extension tubes adapted to be coupled end-to-end, each tube having at its ends a tubular tip end-abutting the tip of an adjoining extension tube and each being externally formed with a plurality of angularly spaced lugs, and a coupler sleeve adapted to be fitted upon one extension tube and threaded internally to receive the lugs thereof and to receive the lugs of the abutted extension tube, the threads being closed at one end, whereby tightening of the coupler sleeve draws together the abutted ends of the extension tubes.

10. The specimen collection device defined in claim 9, including a sealing ring interposed between the abutted ends of the extension tubes, the ends of said extension tubes being annularly recessed for seating said sealing ring.

References Cited

UNITED STATES PATENTS

| | | | |
|---|---|---|---|
| 289,997 | 12/1883 | De Luze | 43—139 |
| 1,658,311 | 2/1928 | Tonso | 15—415 |
| 1,797,557 | 3/1931 | Stine et al. | 43—139 |
| 2,085,042 | 6/1937 | Replogle | 15—335 X |
| 2,300,765 | 11/1942 | Barnhart | 43—139 |
| 2,672,987 | 3/1954 | Hutchinson | 210—207 |
| 2,843,400 | 7/1958 | Van Doren | 285—7 |
| 3,018,579 | 1/1962 | Girden | 43—4 |
| 3,184,878 | 5/1965 | Senne | 43—4 |
| 3,193,992 | 7/1965 | Findley et al. | 55—367 |
| 3,231,997 | 2/1966 | Shugarman | 43—4 |

FOREIGN PATENTS 566,213  11/1958  Canada.

SAMUEL KOREN, *Primary Examiner.*

ALDRICH F. MEDBERY, *Examiner.*